United States Patent [19]

Eckhardt et al.

[11] Patent Number: 5,037,939
[45] Date of Patent: Aug. 6, 1991

[54] THERMOTROPIC, FULLY AROMATIC POLYESTERS PREPARED BY POLYCONDENSATION OF AROMATIC DIPHENOLS AND AROMATIC CARBOXYLIC ACIDS

[75] Inventors: Volker Eckhardt; Dieter Freitag; Karsten-Josef Idel, all of Krefeld, Fed. Rep. of Germany

[73] Assignee: Bayer Aktiengesellschaft, Leverkusen-Bayerwerk, Fed. Rep. of Germany

[21] Appl. No.: 546,035

[22] Filed: Jun. 29, 1990

[30] Foreign Application Priority Data

Jul. 14, 1989 [DE] Fed. Rep. of Germany ....... 3923294

[51] Int. Cl.$^5$ ...................... C08G 63/02; C08G 63/18
[52] U.S. Cl. .................................. 528/193; 528/176; 528/194
[58] Field of Search ................. 528/176, 193, 194

[56] References Cited

U.S. PATENT DOCUMENTS 4,600,764 7/1986 Dicke et al. .......................... 528/128
4,614,789 9/1986 Dicke et al. .......................... 528/128
4,841,014 6/1989 Brodowski .......................... 528/191

Primary Examiner—Harold D. Anderson
Assistant Examiner—T. Mosley
Attorney, Agent, or Firm—Connolly and Hutz

[57] ABSTRACT

Thermotropic, fully aromatic polyesters which have been prepared by polycondensation of p-hydroxybenzoic acid, hydroquinone, 4,4-dihydroxydiphenyl, terephthalic acid and isophthalic acid and which contain specific amounts of the radicals of the compounds mentioned are distinguished by an excellent toughness, very high heat distortion temperature and good processability.

7 Claims, No Drawings

THERMOTROPIC, FULLY AROMATIC POLYESTERS PREPARED BY POLYCONDENSATION OF AROMATIC DIPHENOLS AND AROMATIC CARBOXYLIC ACIDS

The present invention relates to high molecular weight, thermotropic polyesters of excellent toughness, very high heat distortion temperature and good processability, a process for their preparation and their use for the production of shaped articles, filaments, fibres and films.

Those substances which form liquid crystal melts are described as "thermotropic". Thermotropic polyesters are already known. A literature survey is to be found, for example, in DE 3 325 787 and EP 134 959. An investigation of the liquid crystal state of the polymer melts is also described there.

Shaped articles of all kinds, films, filaments and fibres with unusual mechanical properties can be produced from thermotropic polyesters by thermoplastic shaping. A prerequisite is, however, that the polyesters can be melted without decomposition.

The simplest fully aromatic polyesters, such as poly(4-hydroxybenzoate) and poly(1,4-phenylene terephthalate) do not meet this prerequisite. They melt at 600° C., with decomposition.

DE 2 025 971 has described fully aromatic polyesters based on p-hydroxybenzoic acid, aromatic dicarboxylic acids, such as isophthalic acid or terephthalic acid, and aromatic dihydroxy compounds, such as hydroquinone, resorcinol or 4,4'-dihydroxydiphenyl. It was found in our own investigations that some of the compositions listed in the examples (see examples 1, 2, 3, 4, 9 and 11) have heat distortion temperatures above 200° C. However, the processing temperatures for these highly heat resistant polyesters are at temperatures above 400° C., so that thermoplastic shaping in conventional units is made very difficult or is completely impossible. On the other hand, the lower-melting compositions mentioned in the examples are characterized by a heat distortion temperature significantly below 200° C.

For some areas of use, e.g. in the market segment of electrics/electronics, heat distortion temperatures of more than 250° C. are required (ISO/R 75, method A), since the components of plastic employed, such as plug receptacles or coil formers, are subjected to a so-called flow soldering process during the manufactuing process. During this, temperatures of up to 300° C. occur for a short time. At the same time, a good toughness is required of the plastics employed in these areas, since the finished components are in some cases exposed to considerable flexural stresses during the assembling operation (e.g. snap-fit connections).

DE 3 629 211 describes thermotropic, fully aromatic polyesters based on phydroxybenzoic acid, terephthalic acid, isophthalic acid, hydroquinone, 4,4-dihydroxydiphenyl and if appropriate other substituted linear dihydroxy compounds. The polyesters mentioned in the examples can be processed at temperatures below 380° C., in some cases below 360° C. However, of the compositions described in the examples, the types which have heat distortion temperatures which are adequate for electrical uses showed unsatisfactory toughnesses in our investigations (example 1). Conversely, the heat distortion temperature of adequately tough compositions is much too low (example 2).

The object of the present invention was therefore to provide thermotropic, aromatic polyesters with a previously unknown combination of properties of high toughness, good thermoplastic processability and very high heat distortion temperature.

The impact strength, determined according to Izod, method 1C, should be at least 50 kJ/m², preferably more than 80 kJ/m².

The processing temperature should be below 380° C., preferably below 360° C.

The heat distortion temperature, measured in accordance with ISO/R 75, method A, should be at least 260° C.

Surprisingly, it has been found that thermotropic polyesters have the desired combination of advantageous properties if they are built up from phydroxybenzoic acid, hydroquinone, 4,4'-dihydroxydiphenyl, terephthalic acid and isophthalic acid in precisely defined concentration ratios.

The invention thus relates to thermotropic, fully aromatic polyesters containing recurring structural units of the formulae:

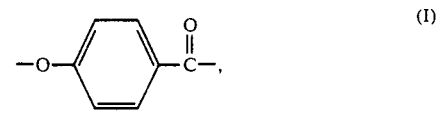

(I)

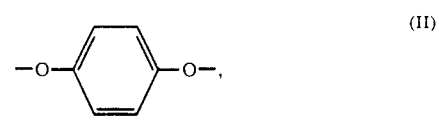

(II)

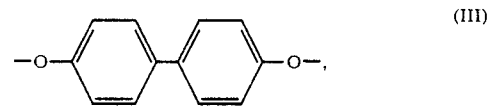

(III)

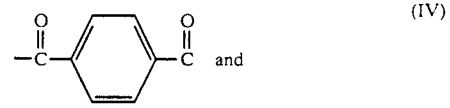

(IV)

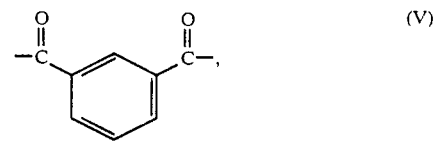

(V)

wherein the polyesters contain the cocondensed radicals (I) in an amount of 64-68 mol %, preferably 66 mol %, the cocondensed radicals (II) in an amount of 15-19 mol %, preferably 17 mol %, and the cocondensed radicals (IV) in an amount of 25-29 mol %, preferably 27 mol %, in each case based on the sum of the radicals (I), (II) and (III), with the proviso that the molar ratio of the cocondensed radicals [(II)+(III)]/[(IV)+(V)] is 0.95 to 1.05:1.0, but preferably 1.0:1.0.

The polyesters according to the invention can contain the structural units (I) to (V), which are derived from the corresponding acids and hydroxy compounds, in random distribution, in segments or in blocks.

Regarding component (I), it should be remembered that longer blocks greatly increase the melting point and the melt viscosity.

The polyesters according to the invention can contain —COOH, —OH, —OC₆H₅, acyloxy or a radical originating from chain stoppers as end groups. Preferred chain stoppers are monofunctional aromatic hydroxy compounds, such as 4-hydroxydiphenyl, p-nonylphenol, 4-(1,1,3,3-tetramethyl-butyl)phenol and $\beta$-naphthol, and aromatic monocarboxylic acids, such as benzoic acids, diphenylcarboxylic acids and naphthalenecarboxylic acids. The chain stoppers can be employed in amounts of 0.1 to 15 mol %, preferably 0.2 to 5 mol %, in the case of monohydroxy compounds based on the dihydroxy compounds, and in the case of monocarboxylic acids based on the dicarboxylic acids.

Branching agents which can be employed are monomers which are trifunctional or more than trifunctional, preferably trifunctional and tetrafunctional—and preferably aromatic—such as phloroglucinol, 1,3,5-benzenetricarboxylic acids or 3,5-dihydroxybenzoic acid, in amounts of about 0.1 to 2, preferably up to 1.0 mol %, in the case of poly- and hydroxycarboxylic acids based on the dicarboxylic acids, and in the case of polyols based on the diphenols.

The melt viscosity of the polyesters according to the invention, in each case measured above the transition temperature, determined by DSC (differential scanning calorimetry), from the crystalline into the liquid crystal phase (usually between 330° and 345° C.) using a nozzle with a length/diameter ratio of 20 at a shearing rate of $10^3 s^{-1}$, is as a rule 0.5 to 2,000, preferably 5 to 1,000, in particular 10 to 500 Pa.s.

The polyesters according to the invention can be prepared by various processes, e.g. by condensation or transesterification of the hydroxycarboxylic acids, dicarboxylic acids and diphenols, or their reactive derivatives, derived from the radicals I, II, III, IV and V and subsequent polycondensation (c.f. e.g. R. W. Lenz, "Synthetic routes to liquid crystalline polymers" in: Recent Advances in Liquid Crystalline Polymers, Elsevier, New York 1985).

Examples of preferred synthesis processes are the reaction of the lower acyl esters of the compounds (I), (II) and (III) with terephthalic acid (IV) and isophthalic acid (V), it also being possible for the acyl esters to be prepared in situ, and the reaction of the aryl esters of the compounds (I), (IV) and (V) with hydroquinone (II) and 4,4'-dihydroxydiphenyl (III), it likewise being possible for the aryl esters to be prepared in situ.

According to a particularly preferred synthesis process, the acetates of the compounds (I), (II) and (III) are reacted with terephthalic acid (IV) and isophthalic acid (V), the acetates being prepared in situ.

The reactions can be carried out in the melt or in inert high-boiling solvents (c.f. e.g. DE-OS 2 025 971).

The radicals of the compounds (I) to (V) are incorporated into the polyesters in the ratio of the starting components.

It may be advantageous to accelerate both the condensation or transesterification reaction and the polycondensation reactions catalytically. Such catalysts are known, e.g. hydroxides, halides, alcoholates, phenolates or salts of inorganic or organic acids (preferably carboxylic acid salts), complex salts or mixed salts of the alkaline earth metals, such as magnesium and calcium; of the sub-group elements, such as vanadium, titanium, manganese, cobalt, nickel, zinc, lanthanum, cerium or zirconium, or of elements of other groups of the periodic table, such as germanium, tin, lead and antimony, or also alkali metals or alkaline earth metals themselves, in particular sodium, sodium hydroxide, lithium acetate, sodium acetate, potassium acetate, calcium acetate, magnesium acetate, cobalt acetate, zinc acetate, calcium benzoate, magnesium acetylacetonate, zinc acetylacetonate, vanadyl $C_1$-$C_8$-alkoxides, titanium alkoxides, such as titanium tetrabutylate, titanium tetrapropylate and alkoxytitanium silicates, zirconium butylate, zirconium propylate, titanium tetraphenolate, sodium phenolate, germanium dioxide, antimony trioxide, dialkyl- and diaryltin oxide, dibutyl-tin diacetate and dibutyl-dimethoxytin.

The amounts of catalyst are preferably 0.0001 to 1, in particular 0.001 to 0.2 wt. %, based on the total weight of the monomers employed.

The polyesters according to the invention can be prepared at temperatures of about 150° C. to 345° C., the reaction in general being started at low temperatures and the temperature being increased continuously as the course of the reaction progresses. As the rate of reaction subsides, vacuum can be applied, the pressure preferably being reduced continuously from normal pressure to about 0.1 mbar.

The resulting product—preferably in granulate form—can be subjected to a solid phase after-condensation, if appropriate under reduced pressure at temperatures of about 200° C. to 300° C., preferably 240 to 280° C.; after 1 to 25 hours, the molecular weight has increased and the resulting properties of the polyester have improved noticeably.

The invention thus also relates to a process for the preparation of the new polyesters, which is characterized in that the hydroxycarboxylic acids, dicarboxylic acids and diphenols, or their reactive derivatives, which can also be prepared in situ, derived from the radicals I, II, III, IV and V are reacted, if appropriate in the presence of catalysts, chain stoppers and branching agents, at temperatures of 150° C. to 345° C., if appropriate under reduced pressure.

The polyesters according to the invention can be mixed with up to 70 wt. %, preferably 1 to 65 wt. %, particularly preferably 30–50 wt. %, based on the total weight of the filled compositions, of reinforcing substances and/or fillers. Representative which may be mentioned for such substances are glass fibres, carbon fibres, mica, quartz material, kaolin, calcium silicate, feldspar and chalk.

Dyestuffs or pigments, such as carbon black, titanium dioxide, cadmium sulphide, ultramarine blue or phthalocyanine dyestuffs, can furthermore be added in amounts of up to 10 wt. % for specific uses.

As a result of their relatively low melt viscosity, the thermotropic polyesters according to the invention can advantageously be processed from the melt to give injection-moulded mouldings, filaments, fibres, tapes and films, the shearing forces which occur resulting in a molecular orientation which is greatly influenced by the strength of the shearing forces. They moreover show a pronounced structural viscosity, i.e. the melt viscosity drops markedly when the shearing forces increase. Suitable processing processes are injection moulding, extrusion, pressing and melt spinning.

Mouldings of excellent rigidity and toughness, very high heat distortion point and great dimensional stability can be produced from the polyesters according to the invention. Since the polyesters are exceptionally resistant to chemicals and flame resistant, they are preferably suitable for the production of electrical articles, such as plug receptacles, coil formers, printed circuit boards, plug contacts, embedding compositions for integrated circuits, fitment components, components of chemical engineering apparatuses, such as pipes, vessel linings, rotors, sliding bearings, seals, components for aircraft interior fittings, components of medical technology equipment and components of air-conditioning units and valves.

The invention thus also relates to the use of the new polyesters for the production of shaped articles, filaments, fibres and films.

EXAMPLES

The flexural strength was determined on bending bars (80 mm × 10 mm × 4 mm) in accordance with DIN 53 452 (ISO/R 178). The flexural E modulus was determined on the same test specimen in accordance with DIN 53 457. The heat distortion temperature was measured by determination of the HDT-A temperature on rectangular bars (80 mm × 10 mm × 4 mm) in accordance with DIN 53 461 (ISO 75) (loading: 181.5 N/mm2). The impact strength an and the notched impact strength ak were tested on 80 mm × 10 mm × 4 mm bars in accordance with DIN 53 453 (ISO/R 179).

EXAMPLE 1

The following substances were introduced into a 2 l vessel which can be heated, of V4A steel (Juchheim) with a stirrer, nitrogen inlet and distillation attachment:

235.91 g = 1.708 mol p-hydroxybenzoic acid
48.44 g = 0.440 mol hydroquinone
81.92 g = 0.440 mol 4,4'-dihydroxydiphenyl
116.08 g = 0.699 mol terephthalic acid
30.10 g = 0.181 mol isophthalic acid
383.43 g = 3.815 mol acetic anhydride
0.264 g magnesium acetate
0.100 g K hydroquinonesulphonate The mixture was heated to 170° C. under a nitrogen atmosphere, and as soon as the distillation of acetic acid had subsided the temperature in the reaction vessel was raised stepwise to 320° C. in the course of 3 hours. The pressure was then reduced in stages down to 20 mbar in the course of one hour, while the temperature was raised further to 340° C. The vessel was then ventilated with nitrogen, and after a settling time of 15 minutes the product was forced out through a bottom valve and, after cooling, comminuted by grinding.

On analysis by DSC (differential scanning calorimetry), the polyester had a melting temperature of 338° C. The melt viscosity determined at 350° C. and a shearing rate of $10^3 s^{-1}$ was 16 Pa.s. Liquid crystal properties were detected by examination of the melt by polarization microscopy.

Test specimens (80 × 10 × 4 mm) were produced by injection moulding processing at 350° C. and their technological properties were characterized. The superior combination of properties of the polyesters according to the invention is illustrated by the results summarized in Tab. 1:

The heat distortion temperature (HDT-A) is 272° C.
The impact strength is 94 kJ/m2.

The following comparison examples 1 to 3 demonstrate the considerable advance by the polyesters according to the invention compared with the prior art.

COMPARISON 1 (DE-OS 3 629 211; EXAMPLE 1)

The following substances were introduced into the apparatus described in example 1:
206.80 g = 1.50 mol p-hydroxybenzoic acid
132.48 g = 0.80 mol terephthalic acid
33.12 g = 0.20 mol isophthalic acid
65.85 g = 0.60 mol hydroquinone
74.24 g = 0.40 mol 4,4'-dihydroxydiphenyl
391.78 g = 3.84 mol acetic anhydride
0.264 g magnesium acetate
0.100 g K hydroquinonesulphonate The mixture was heated to 170° C. under a nitrogen atmosphere, and as soon as the distillation of acetic acid subsided the temperature in the reaction vessel was raised stepwise to 320° C. in the course of 3 hours. The pressure was then reduced, while the temperature was raised further to the maximum possible value of 345° C. Under a pressure of 150 mbar the reaction mixture solidified, so that further stirring was not possible. The product could not be isolated by drainage out of the bottom valve.

A melting temperature of 348° C. was determined by DSC on a sample isolated from the cooled reaction mixture after removal of the reactor lid. Because of the problems of isolating the product, no injection moulding investigations could be carried out. The laboratory preparation method described in comparison example 2 was therefore used to determine the properties.

COMPARISON 2 (DE-OS 3 629 211; EXAMPLE 1 [laboratory method])

The following substances were weighed into a 1 l three-necked flask with stirrer, nitrogen inlet and distillation attachment:
36.49 g = 0.99 mol p-hydroxybenzoic acid
87.44 g = 0.53 mol terephthalic acid
21.86 g = 0.13 mol isophthalic acid
43.46 g = 0.40 mol hydroquinone
49.00 g = 0.26 mol 4,4'-dihydroxydiphenyl
258.57 g = 2.53 mol acetic anhydride
0.174 g magnesium acetate
0.066 g K hydroquinonesulphonate The mixture was heated to 170° C. by means of an oil bath under a nitrogen atmosphere. As soon as the distillation of acetic acid subsided the temperature in the reaction vessel was increased to 230° C. in the course of a further hour and then to 300° C. in the course of 2 hours. After 75 min at this temperature, a vacuum was applied. The vacuum was reduced to 0.5 mbar in the course of 50 min, while the temperature was raised to 360° C. The oil bath was then removed and the solidified product was isolated by shattering the flask and comminuted by grinding.

On analysis by DSC, the polyester had a melting temperature of 347° C. The melt viscosity determined at 350° C. and a shearing rate of $10^3 s^{-1}$ was 25 Pa.s. Liquid crystal properties were detected by examination of the melt by polarization microscopy.

The technological properties summarized in Tab. 1 were determined on test specimens (80 × 10 × 4 mm) produced by injection moulding processing at 60° C.

The heat distortion temperature (HDT A) is 265° C.
The impact strength is only 25 kJ/m2.

COMPARISON 3 (DE-OS 3 629 211; EXAMPLE 2)

The following substances were weighed into the apparatus described in example 1:
03.37 g = 1.470 mol p-hydroxybenzoic acid
13.99 g = 0.686 mol terephthalic acid
48.86 g = 0.294 mol isophthalic acid 53.97 g=0.490 mol hydroquinone
91.26 g=0.490 mol 4,4'-dihydroxydiphenyl
385.29 g=3.77 mol acetic anhydride
0.264 g magnesium acetate
0.100 g K hydroquinonesulphonate A pale beige polyester was obtained by the temperature/time programme described in example 1. On analysis by DSC, the polyester had a melting temperature of 316° C. The melt viscosity determined at 350° C. and a shearing rate of $10^3 s^{-1}$ was 14 Pa.s. Liquid crystal properties were detected by examination of the melt by polarization microscopy.

The technological properties summarized in Tab. 1 were determined on test specimens (80×10×4 mm) produced by injection moulding processing at 340° C.

The heat distortion temperature (HDT A) is only 194° C.

The impact strength is 68 kJ/m².

Comparison examples 4 and 5 demonstrate the marked influence of the terephthalic acid and isophthalic acid contents on processability and heat distortion temperature.

COMPARISON 4

The following substances were weighed into the apparatus described in example 1:
235.91 g=1.708 mol p-hydroxybenzoic acid
48.44 g=0.440 mol hydroquinone
81.92 g=0.440 mol 4,4'-dihydroxydiphenyl
124.68 g=0.750 mol terephthalic acid
21.50 g=0.129 mol isophthalic acid
89.43 g=3.815 mol acetic anhydride
0.264 g magnesium acetate
0.100 g K hydroquinonesulphonate The mixture was heated to 170° C. under a nitrogen atmosphere, and as soon as the distillation of acetic acid subsided the temperature in the reaction vessel was raised stepwise to 320° C. in the course of 3 hours. The pressure was then reduced, while the temperature was raised further to the maximum possible value of 345° C. Under a pressure of 300 mbar the reaction mixture solidified, so that further stirring was not possible. The product could not be isolated by drainage out of the bottom valve.

A melting temperature of 362° C. was determined by DSC on a sample of the product isolated from the cooled reaction mixture after removal of the reactor lid. Because of the problems of isolating the product, no injection moulding investigations could be carried out.

COMPARISON 5

The following substances were weighed into the apparatus described in example 1:
235.91 g=1.708 mol p-hydroxybenzoic acid
48.44 g=0.440 mol hydroquinone
81.92 g=0.440 mol 4,4'-dihydroxydiphenyl
103.18 g=0.621 mol terephthalic acid
42.99 g=0.259 mol isophthalic acid
389.43 g=3.815 mol acetic anhydride
0.264 g magnesium acetate
0.100 g K hydroquinonesulphonate A pale beige polyester was obtained by the temperature/time programme described in example 1. On analysis by DSC, the polyester had a melting temperature of 332° C. The melt viscosity determined at 350° C. and a shearing rate of $10^3 s^{-1}$ was 16 Pa.s. Liquid crystal properties were detected by examination of the melt by polarization microscopy.

The technological properties summarized in Tab. 1 were determined on test specimens (80×10×4 mm) produced by injection moulding processing at 340° C.

The lower terephthalic acid content in contrast to example 1 leads to a significantly lower heat distortion temperature (HDT A=229° C.)

The impact strength is 72 jK/m².

Comparison example 6 demonstrates the influence raising the hydroquinone content has on the ease of preparation and processability of the polyesters.

COMPARISON 6

The following substances were weighed into the apparatus described in example 1:
235.91 g=1.708 mol p-hydroxybenzoic acid
68.37 g=0.621 mol hydroquinone
48.22 g=0.259 mol 4,4'-dihydroxydiphenyl
16.08 g=0.699 mol terephthalic acid
30.10 g=0.181 mol isophthalic acid
89.43 g=3.815 mol acetic anhydride
0.264 g magnesium acetate
0.100 g K hydroquinonesulphonate The mixture was heated to 170° C. under a nitrogen atmosphere, and as soon as the distillation of acetic acid subsided the temperature in the reaction vessel was raised stepwise to 320° C. in the course of 3 hours. The pressure was then reduced, while the temperature was raised further to the maximum possible value of 345° C. Under a pressure of 400 mbar the reaction mixture solidified, so that further stirring was not possible. The product could not be isolated by drainage out of the bottom valve.

A melting temperature of 371° C. was determined by DSC on a sample of the product isolated from the cooled reaction mixture after removal of the reactor lid. Because of the problems of isolating the product, no injection moulding investigations could be carried out.

EXAMPLE 2

The following substances were introduced into a 400 l kettle, which could be heated, of V4A steel with a stirrer, nitrogen inlet and distillation attachment:
84.69 kg=613.15 mol p-hydroxybenzoic acid
17.08 kg=155.63 mol hydroquinone
28.89 kg=155.15 mol 4,4'-dihydroxydiphenyl
40.81 kg=245.65 mol terephthalic acid
0.74 kg=64.65 mol isophthalic acid
38.55 kg=1357.0 mol acetic anhydride
94 g magnesium acetate
36 g K hydroquinonesulphonate After evacuating and ventilating three times with nitrogen, the kettle was heated to 170° C. Nitrogen was passed over at a rate of 50 l/h. After 2 hours at 170° C., the temperature was increased to 200° C., and after 30 minutes at this temperature, it was increased further to 250° C. Finally, the mixture was heated to 330° C., and after a further 90 minutes to 340° C. A vacuum was applied and the pressure in the kettle was reduced to 30 mbar in the course of one hour. The kettle was then ventilated with nitrogen, and after a settling time of 30 minutes the product was forced out through a bottom valve and granulated.

Some of the pale beige polyester isolated in this way was subjected to after-condensation in the solid phase at 250° C. (20 hours).

The melting temperature of the product, determined by DSC, was 337° C. A melt viscosity of 43 Pa.s was determined at 350° C. and $10^3 s^{-1}$.

Test specimens were produced by injection moulding processing on an Arburg 270 injection moulding machine at a temperature of 350° C. and their technological properties were characterized. The following properties were determined:

| | |
|---|---|
| Impact strength (Izod IC) | 108 kJ/m² |
| Notched impact strength (Izod IA) | 47 kJ/m² |
| Tensile E modulus | 20.5 GPa |
| Tensile strength | 213 MPA |
| Elongation at break | 1.2% |
| Flexural E modulus | 13.1 GPA |
| Flexural strength | 174 MPa |
| Outer fibre strain | 3.6% |
| HDT A | 275° C. |
| HDT C | 240° C. |

The polyesters according to the invention are superior to all known thermotropic polyesters in their combination of properties of high heat distortion temperature coupled with favourable processability, high rigidity and strength and excellent notched impact strength.

TABLE 1

Properties of the polyesters according to examples 1 and 2 and comparison 1–6

| Example | Composition (mol %)[1] pHB | Hy | DOD | TA | IA | $T_m$[2] | $T_{process.}$[3] (°C.) | HDT A[4] | $a_n$[5] (kJ/m²) |
|---|---|---|---|---|---|---|---|---|---|
| 1[6] | 66 | 17 | 17 | 27 | 7 | 338 | 350 | 272 | 94 |
| 2[7] | 66 | 17 | 17 | 27 | 7 | 337 | 350 | 274 | 108 |
| Comparison 1 | 60 | 24 | 16 | 32 | 8 | 348 | cannot be prepared in a steel autoclave | | |
| Comparison 2[8] | 60 | 24 | 16 | 32 | 8 | 347 | 360 | 265 | 25 |
| Comparison 3 | 60 | 20 | 20 | 28 | 12 | 316 | 340 | 194 | 68 |
| Comparison 4 | 66 | 17 | 17 | 29 | 5 | 362 | cannot be prepared in a steel autoclave | | |
| Comparison 5 | 66 | 17 | 17 | 24 | 10 | 332 | 340 | 229 | 72 |
| Comparison 6 | 66 | 24 | 10 | 27 | 7 | 371 | cannot be prepared in a steel autoclave | | |

[1]pHB — p-hydroxybenzoic acid
Hy — hydroquinone
DOD — 4,4'-dihydroxydiphenyl
TA — terephthalic acid
IA — isophthalic acid
[2]melting temperature from DSC measurement
[3]processing temperature
[4]heat distortion temperature according to ISO/R75 (method A)
[5]impact strength determined according to Izod, method 1 C
[6]preparation in a 2 l steel autoclave
[7]preparation in a 400 l steel autoclave
[8]preparation in a laboratory autoclave

We claim:

1. Thermotropic, fully aromatic polyester consisting essentially recurring structural units of the formulae:

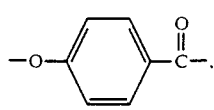 (I)

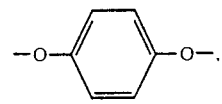 (II)

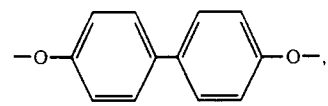 (III)

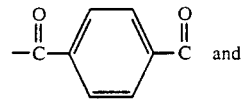 (IV)

and

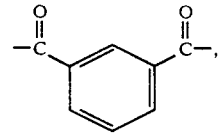 (V)

wherein the polyester contains the cocondensed radicals (I) in an amount of 64–58 mol %, the cocondensed radicals (II) in an amount of 15–19 mol % and the cocondensed radicals (IV) in an amount of 25–29 mol %, in each case based on the sum of the radicals (I), (II) and (III), with the proviso that the molar ratio of the cocondensed radicals [(II)+(III)]/[(IV)+(V) ] is 0.95 to 1.05:1.0.

2. Polyester according to claim 1 containing the cocondensed radicals (I) in an amount of b 66 mol %.

3. Polyester according to claim 1 containing the cocondensed radicals (II) in an amount of 17 mol %.

4. Polyester according to claim 1 containing the cocondensed radicals (IV) in an amount of 27 mol %.

5. Polyester according to claim 1 wherein the molar ratio of cocondensed radicals [(II)+(III)]/[(IV)+(V)] is 1:1.

6. A shaped article, filament, fiber or film comprising the polyester according to claim 1.

7. Compositions comprising the polyester of claim 1 and fillers or reinforcing substances in an amount up to 70 wt. % based on the total weight of the composition.

* * * * *